(12) United States Patent
Dutart et al.

(10) Patent No.: US 6,516,773 B2
(45) Date of Patent: Feb. 11, 2003

(54) METHOD AND APPARATUS FOR ADJUSTING THE INJECTION CURRENT DURATION OF EACH FUEL SHOT IN A MULTIPLE FUEL INJECTION EVENT TO COMPENSATE FOR INHERENT INJECTOR DELAY

(75) Inventors: Charles H. Dutart, Washington, IL (US); Brian G. Mcgee, Chillicothe, IL (US)

(73) Assignee: Caterpillar Inc, Peoria, IL (US)

(*) Notice: Subject to any disclaimer, the term of this patent is extended or adjusted under 35 U.S.C. 154(b) by 0 days.

(21) Appl. No.: 09/848,126

(22) Filed: May 3, 2001

(65) Prior Publication Data
US 2002/0162542 A1 Nov. 7, 2002

(51) Int. Cl.⁷ ................................................ F02B 3/00
(52) U.S. Cl. ...................................... 123/299; 123/305
(58) Field of Search ........................... 123/299, 300, 123/305, 295, 436, 490, 499; 239/533.2, 5; 251/129.01, 129.15

(56) References Cited

U.S. PATENT DOCUMENTS

| | | | |
|---|---|---|---|
| 3,575,146 A | * | 4/1971 | Creighton et al. .......... 123/299 |
| 4,571,683 A | | 2/1986 | Kopbayashi et al. |
| 4,576,135 A | | 3/1986 | Johnson |
| 4,621,599 A | | 11/1986 | Igashira et al. |
| 4,704,999 A | | 11/1987 | Hashikawa et al. |
| 4,729,056 A | | 3/1988 | Edwards et al. |
| 4,836,161 A | | 6/1989 | Abthoff et al. |
| 4,922,878 A | | 5/1990 | Shinogle et al. |
| 5,020,979 A | | 6/1991 | Askew |
| 5,070,836 A | | 12/1991 | Wahl et al. |
| 5,113,833 A | | 5/1992 | Nagano et al. |
| 5,245,972 A | | 9/1993 | Denz et al. |
| 5,267,545 A | | 12/1993 | Kitson |
| 5,268,842 A | | 12/1993 | Martson et al. |
| 5,277,164 A | | 1/1994 | Takahashi et al. |
| 5,320,079 A | | 6/1994 | Kuwabara |
| 5,379,733 A | | 1/1995 | Haddick et al. |

(List continued on next page.)

FOREIGN PATENT DOCUMENTS

EP        0 221 832 A2        5/1987

OTHER PUBLICATIONS

SAE Feb 24–27, 1997 A New Concept for Low Emission Diesel Combusion—Printed from Diesel Engine Combustion Processes and Emission Control Technologies (SP–1246).

Primary Examiner—Willis R. Wolfe
Assistant Examiner—Mahmoud Gimie
(74) Attorney, Agent, or Firm—Blackwell Sanders Peper Martin LLP; R Carol Wilbur

(57) ABSTRACT

A fuel injection control system and method for controlling multiple fuel injections to a cylinder of an engine during a fuel injection event based upon engine operating conditions, the control system including an electronic controller coupled to an electronically controlled fuel injector, the controller being operable to determine and deliver a fuel injection current signal to the fuel injector to adjust the duration of each fuel shot associated with a particular fuel injection event to compensate for the inherent delay of the fuel injector in responding to the injection current signal, that is, the delay between the start of the injection current signal and the actual start of the fuel injection.

21 Claims, 5 Drawing Sheets

U.S. PATENT DOCUMENTS

| | | |
|---|---|---|
| 5,427,072 A | 6/1995 | Udo |
| 5,427,083 A | 6/1995 | Ahern |
| 5,450,829 A | 9/1995 | Beck |
| 5,460,128 A | 10/1995 | Kruse |
| 5,492,098 A | 2/1996 | Hafner et al. |
| 5,499,608 A | 3/1996 | Meister et al. |
| 5,507,260 A | 4/1996 | Hintzen |
| 5,540,205 A | 7/1996 | Davis et al. |
| 5,549,092 A | 8/1996 | Hasegawa et al. |
| 5,566,650 A | 10/1996 | Kruse |
| 5,566,660 A | 10/1996 | Camplin et al. |
| 5,588,415 A | 12/1996 | Ahern |
| 5,609,131 A | 3/1997 | Gray, Jr. et al. |
| 5,634,448 A | 6/1997 | Shinogle et al. |
| 5,647,317 A | 7/1997 | Weisman, II et al. |
| 5,678,521 A | 10/1997 | Thompson et al. |
| 5,685,273 A | 11/1997 | Johnson et al. |
| 5,701,870 A | 12/1997 | Gottshall et al. |
| 5,704,336 A | 1/1998 | Wrobel |
| 5,722,373 A | 3/1998 | Paul et al. |
| 5,732,680 A | 3/1998 | Ninomiya et al. |
| 5,740,775 A | 4/1998 | Suzuki et al. |
| 5,740,776 A | 4/1998 | Enderle et al. |
| 5,746,183 A | 5/1998 | Parke et al. |
| 5,778,850 A | 7/1998 | Buratti et al. |
| 5,794,585 A | 8/1998 | Yonezawa et al. |
| 5,803,049 A | 9/1998 | Harcombe |
| 5,832,901 A | 11/1998 | Yoshida et al. |
| 5,839,275 A | 11/1998 | Hirota et al. |
| 5,865,153 A | 2/1999 | Matsumoto |
| 5,865,158 A | 2/1999 | Cleveland et al. |
| 5,893,347 A | 4/1999 | McGee et al. |
| 5,924,403 A * | 7/1999 | Thomas ............... 123/300 |
| 5,979,398 A | 11/1999 | Yanagihara |
| 5,979,412 A | 11/1999 | Werner |
| 5,986,871 A | 11/1999 | Forck et al. |
| 6,000,384 A | 12/1999 | Brown et al. |
| 6,006,727 A | 12/1999 | Katashiba et al. |
| 6,009,849 A | 1/2000 | Yamanoto et al. |
| 6,014,956 A | 1/2000 | Cowden et al. |
| 6,021,370 A | 2/2000 | Bellinger et al. |
| 6,026,780 A | 2/2000 | Barnes et al. |
| 6,032,642 A | 3/2000 | Trumbower et al. |
| 6,044,824 A | 4/2000 | Mamiya et al. |

\* cited by examiner

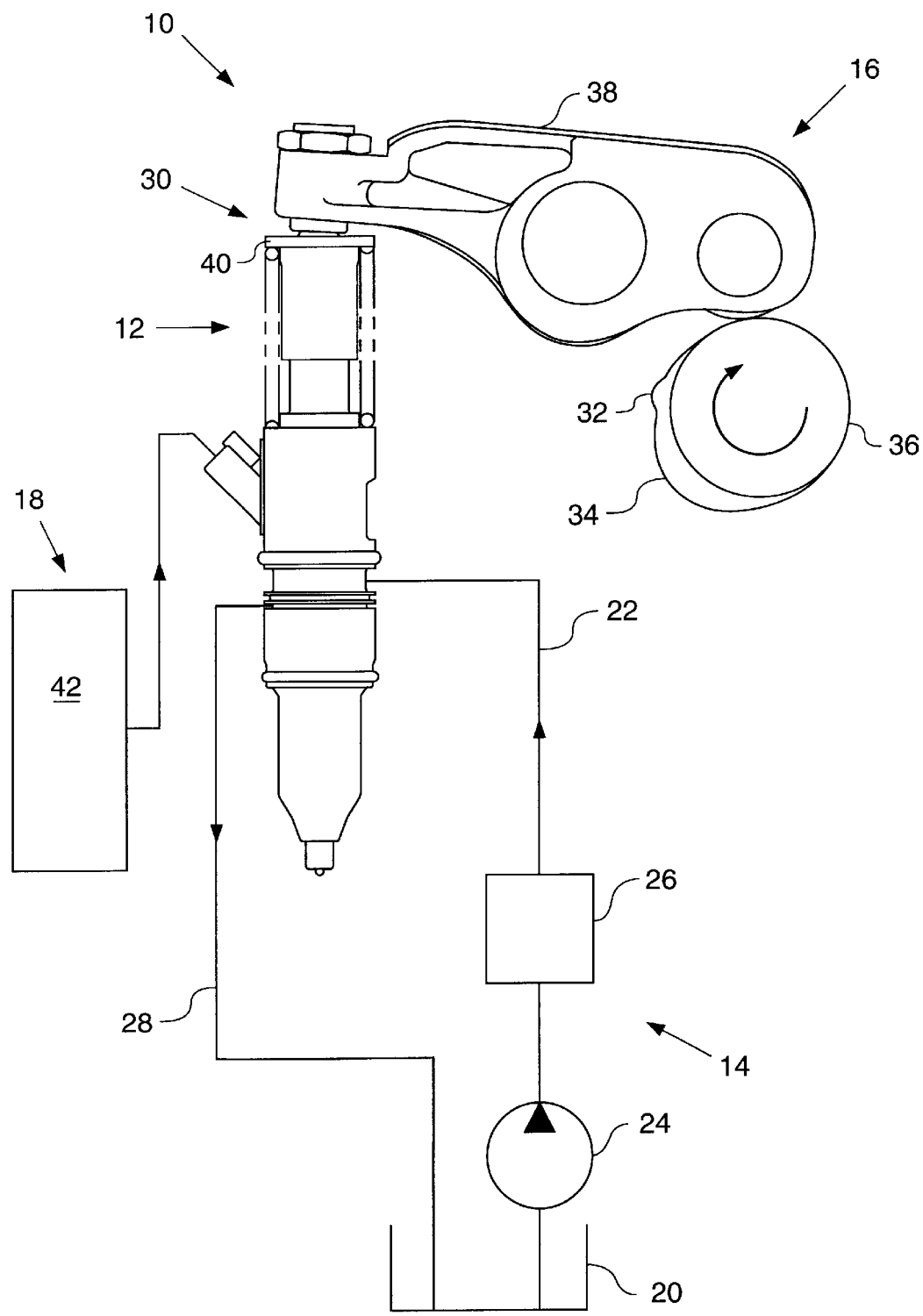

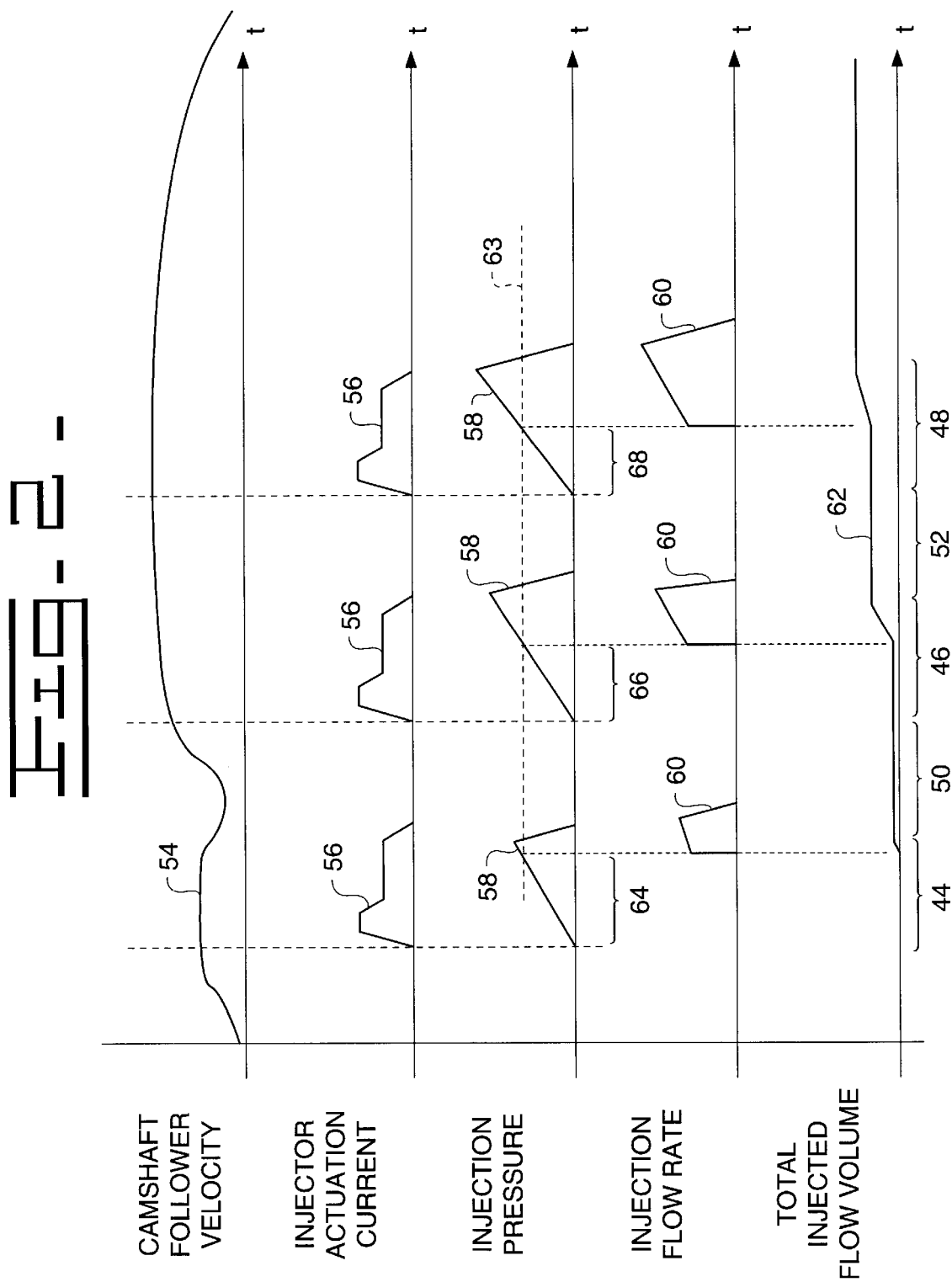

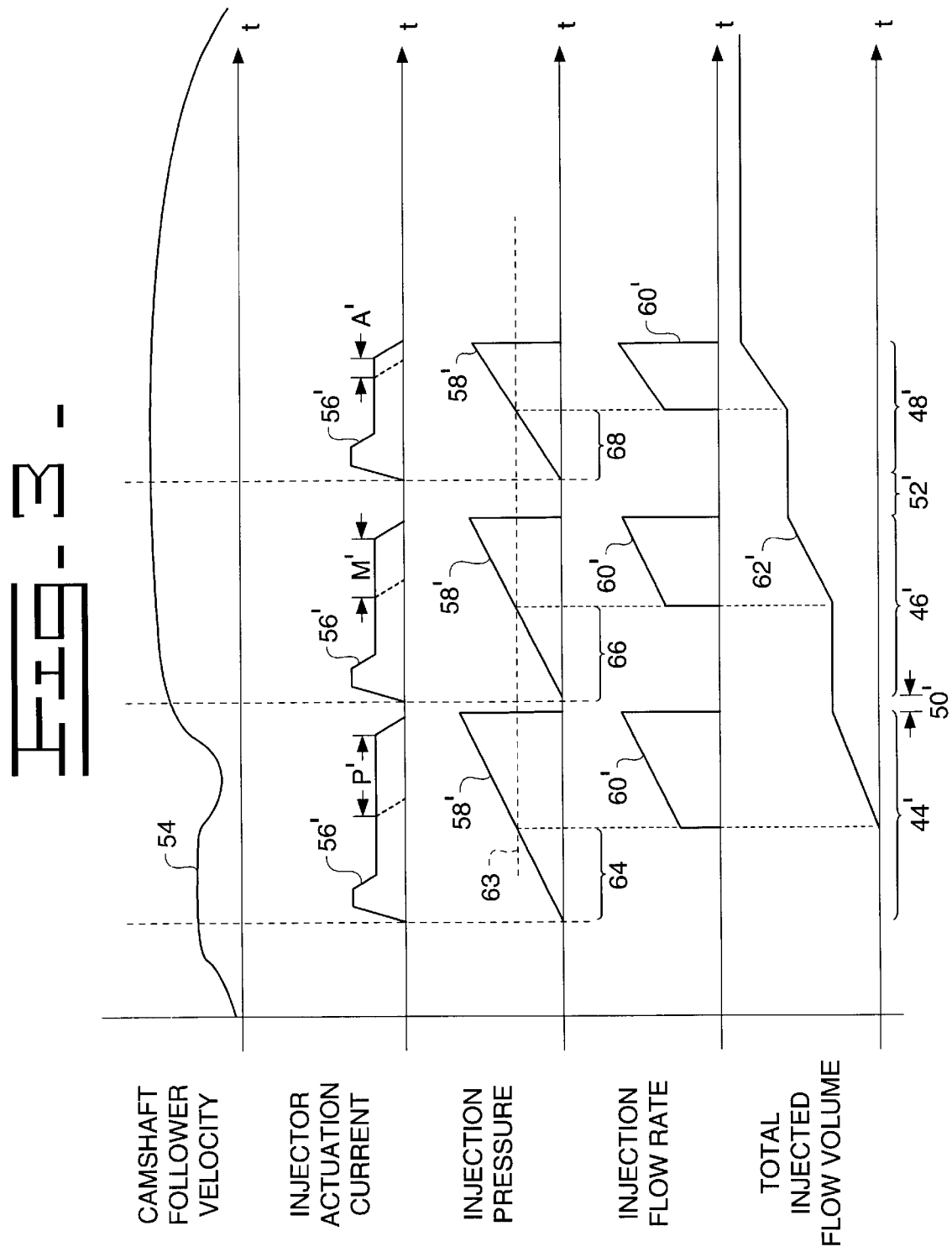

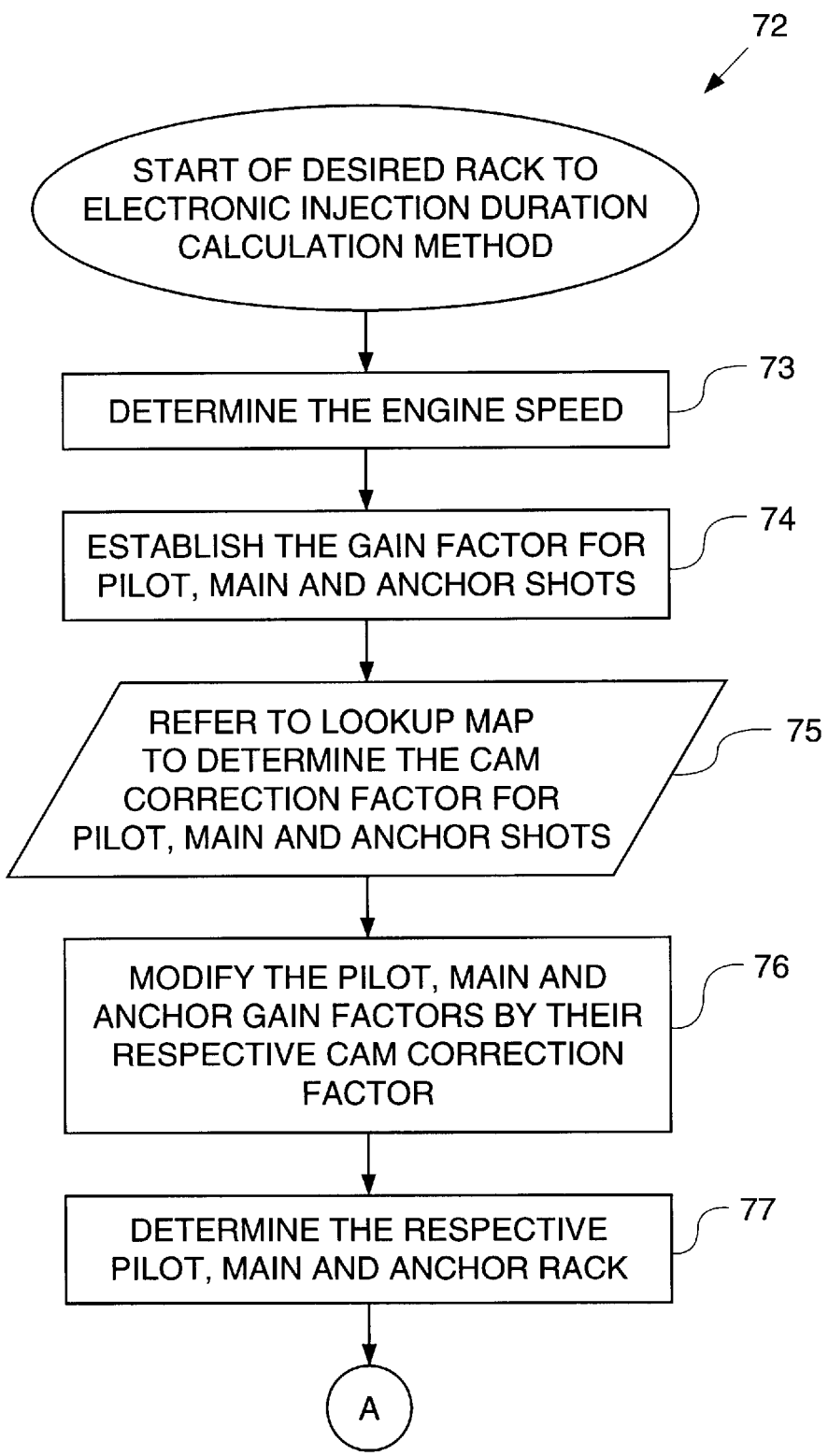

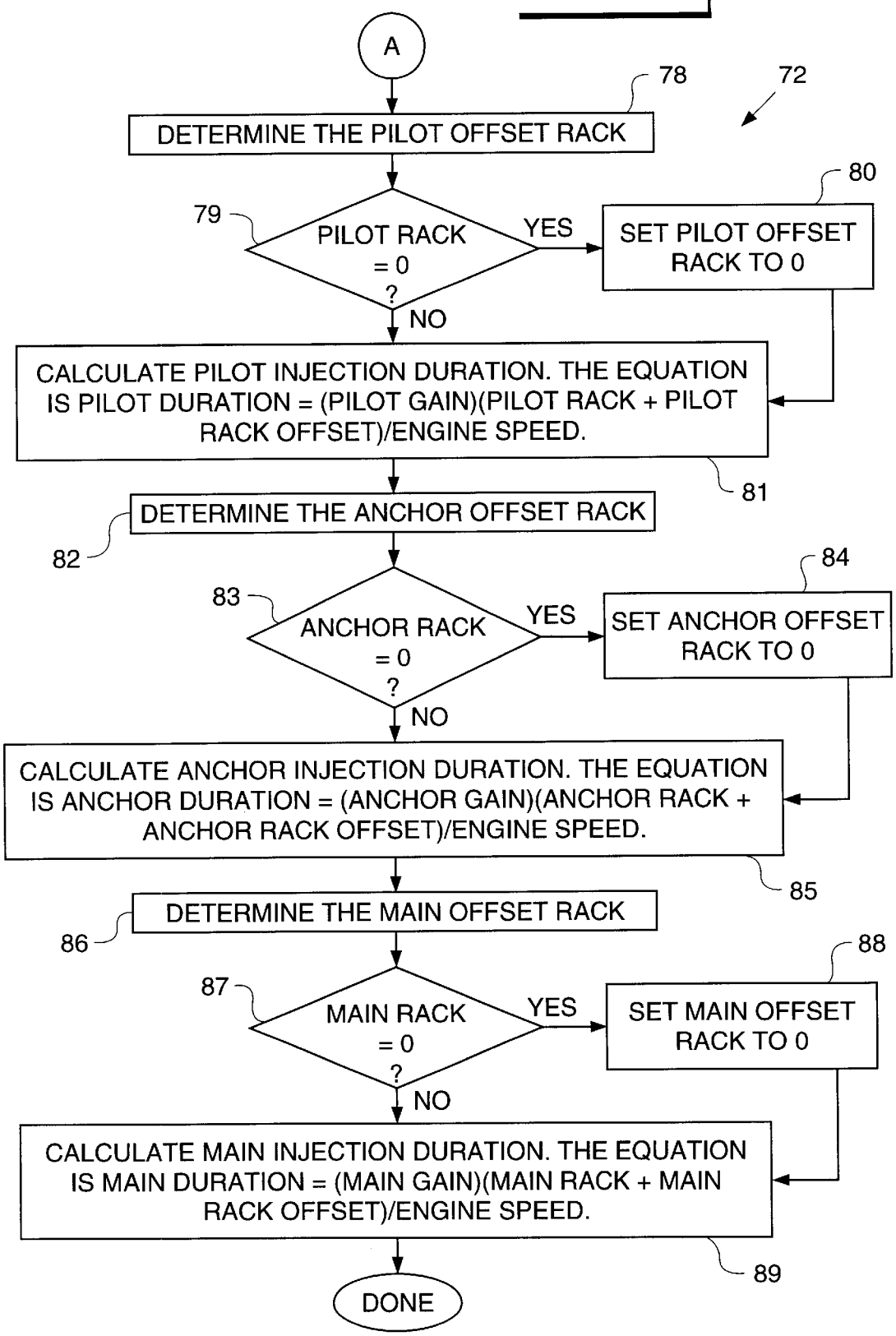

METHOD AND APPARATUS FOR ADJUSTING THE INJECTION CURRENT DURATION OF EACH FUEL SHOT IN A MULTIPLE FUEL INJECTION EVENT TO COMPENSATE FOR INHERENT INJECTOR DELAY

TECHNICAL FIELD

This invention relates generally to electronically controlled fuel injection systems and, more particularly, to a method and apparatus for adjusting the duration of each fuel shot associated with a multi-shot fuel injection to compensate for the inherent delay between electrical activation of the fuel injector and the actual start of fuel injection.

BACKGROUND

Electronically controlled fuel injectors are well known in the art including hydraulically actuated electronically controlled fuel injectors, mechanically actuated electronically controlled fuel injectors, and digitally controlled fuel valves. Electronically controlled fuel injectors typically inject fuel into a specific engine cylinder as a function of an injection signal received from an electronic controller. These signals include waveforms that are indicative of the desired timing and quantity of fuel to be injected into the cylinders. As used throughout this disclosure, an injection event is defined as the injections that occur in a cylinder during one cycle of the engine. For example, one cycle of a four cycle engine for a particular cylinder, includes an intake, compression, expansion, and exhaust stroke. Therefore, the injection event in a four stroke engine includes the number of injections, or shots, that occur in a cylinder during the four strokes of the piston. The term shot as used in the art may also refer to the actual fuel injection or to the command current signal to a fuel injector or other fuel actuation device indicative of an injection or delivery of fuel to the engine. Each injection waveform may include a plurality of distinct and/or rate shaped fuel shots delivered to a cylinder during a particular fuel injection event.

Techniques utilizing multiple fuel injection techniques have been utilized to modify the burn characteristics of the combustion process in an attempt to reduce emission and noise levels. Multiple fuel injection involves splitting the total fuel delivery to the cylinder during a particular injection event into a number of separate fuel injection shots, such as into two fuel shots generally referred to as a main injection, and an anchor injection.

Due to the construction and operation of both mechanically actuated electronically controlled fuel injectors as well as hydraulically actuated electronically controlled fuel injectors, there is a delay or dead band associated with the injection current duration and the actual start of fuel injection for a multi-shot fuel injection event. This delay is known in the art as the SOC/SOI delay, that is, the delay from the start of current (SOC) to the start of the injection (SOI).

If only one shot is used, the SOC/SOI delay may be accounted for by the governor as a fuel offset. But as multiple shots come and go during engine operation, the governor must likewise adjust with additional offsets for each pulse. Furthermore, if mechanically actuated injections have different pressure capabilities for each shot due to cam profile, then different physical quantities of fuel will be delivered for each shot with the same electronic duration. Therefore, delays arise during multiple injection events that may not be experienced during single injection events. The delays create issues with the overall injection strategy with respect to injection timing, duration, and fuel quantity that do not occur with single injection strategies.

Because the current duration associated with each separate fuel shot in a particular fuel injection event is determined based upon the amount of fuel desired to be apportioned to that particular fuel shot, any delay in activation of the fuel injector or other fuel injecting device to start fuel injection, if not accounted for, may result in delivering a less than desired amount of fuel during that particular fuel shot. For example, inaccuracies in one fuel shot may effect the fuel injected into subsequent shots, and the fuel injection profile, and therefore lead to reduced efficiency and increased emissions for a particular injection event. The effects of this delay are sometimes more prominent in mechanically actuated fuel injectors due to the different velocity and acceleration profiles and operation of the various cams or other mechanical configurations associated therewith for actuating such injectors as compared to hydraulically actuated fuel injectors. Nevertheless, the SOC/SOI delay does affect fuel delivery and efficiency in both types of electronically-controlled fuel injectors.

It is, therefore, desirable to improve the performance of electronically controlled fuel injectors and to adjust the current duration of each fuel shot associated with a particular multi-shot fuel injection event in order to compensate for the SOC/SOI delay and to deliver the appropriate and desired amount of fuel during each such fuel shot.

Accordingly, the present invention is directed to overcoming one or more of the problems as set forth above.

SUMMARY OF THE INVENTION

In one aspect of the present invention there is disclosed an a method for controlling the injection current duration of a fuel injector to inject a predetermined volume of fuel during each fuel shot of a multiple shot event. The comprises the steps of sensing engine speed, determining an initial injection current duration for each fuel shot, establishing an injection delay for each fuel shot, and determining a corrected injection current duration to inject the predetermined volume of fuel for each shot based upon the initial injection current duration, the injection delay and the engine speed.

BRIEF DESCRIPTION OF THE DRAWINGS

For a better understanding of the present invention, reference may be made to the accompanying drawings in which:

FIG. 1 is an elevational view of a mechanically activated fuel injector controlled by the present invention together with a cam shaft and rocker arm and further illustrating a block diagram of a transfer pump and a drive circuit for controlling the fuel injector;

FIG. 2 is a graph of multiple wave traces illustrating, for one complete fuel injection event under given engine operating conditions, a simultaneous sequential summary of injection events for a fuel injector uncorrected by the present invention;

FIG. 3 is a graph of multiple wave traces illustrating, for one complete fuel injection event under given engine operating conditions, a simultaneous sequential summary of injection events for a fuel injector corrected by the present invention;

FIG. 4a is a first segment of a logic diagram showing the operation of the present invention; and FIG. 4b is a second segment of a logic diagram showing the operation of the present invention.

DETAILED DESCRIPTION

Referring to FIG. 1, a portion of a mechanically actuated electronically controlled fuel injection system 10 is shown in an exemplary configuration as adapted for a compression ignition engine. However, it should be understood that the present invention is also applicable to other types of engines, such as rotary engines, modified-cycle engines, in-line engines, or V-type engines, and that the engine may contain one or more engine combustion chambers or cylinders. In addition, it is likewise recognized and anticipated that the present invention is also equally applicable to other types of fuel injection devices including hydraulically actuated electronically controlled injector units with minor modifications thereto.

The fuel system 10 has at least one cylinder head wherein each cylinder head defines one or more separate injector bores, each of which receives an injection device 12. The fuel system 10 further includes fuel supply apparatus or means 14 for supplying fuel to each injector 12, fuel pressurization apparatus or means 16 for causing each injector 12 to pressurize fuel, and controller apparatus or means 18 for electronically controlling the fuel injection system including the manner and frequency in which fuel is injected by the injectors 12 including timing, number of injections per injection event, fuel quantity per injection, time delay between each injection, and the injection profile.

The fuel supplying apparatus 14 preferably includes a fuel tank 20, a fuel supply passage 22 arranged in fluid communication between the fuel tank 20 and the injector 12, a relatively low pressure fuel transfer sump or reservoir 24, one or more fuel filters 26 and a fuel drain passage 28 arranged in fluid communication between the injector 12 and the fuel tank 20. If desired, fuel passages may be disposed in the head of the engine in fluid communication with the fuel injector 12 and one or both of the passages 22 and 28.

The fuel pressurizing apparatus 16 may be any mechanically actuating device, hydraulically actuating device, or a fuel pump. In the embodiment shown, a tappet and plunger assembly 30 associated with the injector 12 is mechanically actuated indirectly or directly by first and second cam lobes 32 and 34 of an engine-driven cam shaft 36. The cam lobes 32 and 34 drive a pivoting rocker arm assembly 38 which, in turn, reciprocates a plunger 40 associated with the tappet and plunger assembly 30. Alternatively, a push rod (not shown) may be positioned between the cam lobes 32 and 34 and the rocker arm assembly 38. In an alternative embodiment, a single-lobe cam (not shown) can be used to deliver all three shots during a single velocity increase of the lobe.

The electronic control apparatus 18 preferably includes an electronic control module (ECM), or electronic controller, 42, the use of which is well known in the art. The ECM 42 typically includes processing capability such as a microcontroller or microprocessor, a governor such as a proportional integral derivative (PID) controller for regulating engine speed, and circuitry including input/output circuitry, solenoid driver circuitry, analog circuits and/or programmed logic arrays as well as associated memory. The memory is connected to the microcontroller or microprocessor and stores instruction sets, maps, look up tables variables, and more. The ECM 42 may be used to control many aspects of fuel injection including: (1) fuel injection timing, (2) total fuel injection quantity during an injection event, (3) fuel injection pressure, (4) the number of injections or fuel shots during each injection event, (5) the time interval(s) between the injections or fuel shots, (6) the time duration of each injection or fuel shot, (7) the fuel quantity associated with each injection or fuel shot, (8) the current level of the injector waveform, and (9) any combination of the above parameters. Each of such parameters is variably controllable independent of engine speed and load. Furthermore, the ECM 42 receives a plurality of sensor input signals which correspond to known sensor inputs such as engine operating conditions including engine speed, throttle position, engine temperature, pressure of the actuation fluid, cylinder piston position and so forth that are used to determine the desired combination of injection parameters for a subsequent injection event.

During its compression stage, the reciprocating plunger 40 displaces any fuel in the injector 12 either through an injection port controlled by a check valve (not shown) during an injection event, or through a spill port controlled by the poppet valve during a non-injection event. The check valve is in a normally closed state, and opens when the fuel pressure within the injector 12 is sufficient to drive the check valve open. The pressure of the fuel within the injector 12 is determined by movement of the plunger 40 in conjunction with the open/close state of the poppet valve. The open/closed state of the poppet valve is determined by a current driven solenoid (not shown) or other actuating device controlled by the ECM 42. Therefore, during compression, the plunger 40 will deliver enough pressure to the fuel in the injector 12 to overcome the closed state of the check valve and, thereby, inject fuel to the associated cylinder unless the ECM 42 directs the solenoid to switch the poppet valve to its open state, in which case the fuel passes, instead, through the spill port.

Preferably, each injector 12 is a unit injector which includes, in a single housing, apparatus for both pressurizing fuel to a high level (for example, 207 Mpa (30,000 psi)) and injecting the pressurized fuel into an associated cylinder. Although shown as a unitized injector 12, the injector 12 could alternatively be of a modular construction wherein the fuel injection apparatus is separate from the fuel pressurization apparatus.

It is recognized that the type of fuel injection desired during any particular fuel injection event will typically vary depending upon various engine operating conditions. In an effort to achieve desired emissions, it has been found that delivering multiple fuel injections to a particular cylinder during a fuel injection event at certain engine operating conditions achieves both desired engine operation as well as emissions control. FIG. 2 shows, one embodiment of wave patterns illustrating the events corresponding to three separate fuel injections, namely, a first fuel injection or pilot shot 44, a second fuel injection or main shot 46, and a third fuel injection or anchor shot 48, delivered during one multi-shot fuel injection event, for a mechanically actuated fuel injector. As illustrated in FIG. 2, the pilot shot 44 is injected into the combustion chamber in advance of the main shot 46 by some time factor 50 resulting from a predetermined angular displacement with respect to cylinder top dead center, and the anchor shot 48 is sequenced after the main shot 46 based upon a predetermined time factor, crank angle or anchor delay 52. Based upon programming associated with the electronic controller module 42, as well as a variety of different maps and/or look up tables stored within the memory of the ECM 42, including maps and/or tables relating to engine speed, engine load, the pressure associated with the plunger 40 speed and point of travel in conjunction with the state of the poppet valve, desired total fuel quantity and other parameters, the ECM 42 will be able to determine the appropriate quantity of fuel desired for each injection shot 44, 46 and 48 and partition the same accordingly. Furthermore, the ECM 42 will determine the desired timing and duration of each individual shot and the anchor delay 52, as well as the associated desired angular displacement for the shots.

In FIG. 2, a first wave trace 54 illustrates the velocity of the camshaft follower 38 as it follows the profiles of cam lobes 32 and 34 of the rotating camshaft 36 during one fuel injection event. Vertical displacement of the first wave trace 54 is proportional to the extent of compression produced by the reciprocating plunger 40.

A second wave trace 56 illustrates an injector actuation current delivered from the ECM 42 to the solenoid or other actuating device to control the open/close state of the poppet valve. The duration of vertical displacement of the injector actuation current waveform corresponds to periods when the solenoid is directing the poppet valve to close and fuel is allowed to pass for delivery to the cylinder.

A third wave trace 58 illustrates the pressure within the injector 12. Vertical displacement of the pressure curve 58 is proportional to the pressure at the check valve of the injector 12.

A fourth wave trace 60 illustrates the flow rate of fuel actually delivered during each injection event. Vertical displacement of the injection rate curve 60 is proportional to the rate at which fuel is injected into the cylinder by the injector 12.

A fifth wave trace 62 illustrates the cumulative volume of fuel delivered from the injector 12 to the associated cylinder at any point during an injection event. The area beneath the fuel curve 62 is proportional to the total volume of fuel delivered.

In the illustrated embodiment, the cam lobe 32 provides for the pilot injection 44, and has a peak profile large enough to provide for a short injection without causing the plunger 40 to exceed its stroke limit. Because the main and anchor injections 46 and 48 are tied close together, the peak profile of cam lobe 34 is sufficient to deliver both injections. The split or anchor delay 52 between the main and anchor injections 46 and 48 is provided when the ECM 42 directs the poppet valve to open momentarily just after the main injection 46 is delivered, thereby momentarily releasing the injector fuel pressure to the check valve. This allows the check valve to close until the ECM 42 directs the poppet valve to close again to build up fuel pressure to the point of forcing the check valve back open to deliver the anchor shot 48.

In practice, when the solenoid directs the poppet valve to switch to a closed state during the periods when the ECM 42 determines that it is time to generate the fuel pressure necessary to deliver the pilot, main and/or anchor shots 44, 46 and 48, an inherent delay occurs due to the time necessary to reach the check valve threshold pressure 63, i.e., to produce sufficient pressure to force the check valve open. This injection delay, known as the SOC/SOI delay, (the delay from the start of current to the start of injection), results in a pilot offset or trim 64, a main offset or trim 66, and an anchor offset or trim 68. That is, for example, the pilot offset 64 is indicative of the injection delay associated with the pilot injection. Therefore, the injection delay associated with the pilot injection may be determined by determining the pilot offset.

The fuel governor (not shown) within the ECM 42 apportions fuel to the injectors 12 in volumes determined appropriate in accordance with input signals received by the ECM 42. Without the benefit of the present invention, the ECM 42 does not account for the pilot, main and anchor offsets (injection delays) 64, 66 and 68, and therefore, responds as though fuel has been delivered to the cylinders 12 over the entire duration that the poppet valve is closed, i.e., throughout the duration of the pilot shot, main shot and anchor shot events 44, 46 and 48. Accordingly, when the ECM 42 determines the end of duration necessary to achieve delivery of the desired volume of fuel (not accounting for injection delays), the ECM 42 controls the solenoid in a manner to open the poppet valve, thereby releasing the injector pressure, allowing the check valve to close, evacuating the remaining fuel through the spill port, and ending the injection event. Due to the SOC/SOI delay, the volume fuel delivered during injection is less than the volume of fuel desired, and therefore, the desired engine speed will not be achieved, and the governor will increase the fuel request for the next injection. In addition, the emissions may increase due to the difference in the desired and actual fuel injection quantity and timing.

To account for the SOC/SOI delay, i.e., the inherent delay in reaching the check valve threshold pressure and assure that the desired amount of fuel is injected during each injection event, the ECM 42 of the present invention is programmed to extend the duration that it energizes the solenoid to hold the poppet valve closed. The extended duration of poppet valve closure after the check valve threshold pressure has been reached yields an increase in the volume of fuel delivered to the cylinder during each injection event, thereby offsetting the effects of the injection delay.

Wave traces illustrating the simultaneous sequential injection events produced when the ECM 42 corrects the injector actuation current 56 by extending the duration of each pulse for a predetermined length of time in accordance with the teachings of the present invention to produce a corrected injector actuation current 56' is shown in FIG. 3. The duration of the portion of the corrected injector actuation current waveform 56' producing the corrected pilot shot 44' is extended over the uncorrected injector actuation current 56 for a predetermined period of P'. The duration of the portion of the corrected injector actuation current waveform 56' producing the corrected main shot 46' is extended over the uncorrected injector actuation current 56 for a predetermined period of M'. The duration of the portion of the corrected injector actuation current waveform 56' producing the corrected anchor shot 48' is extended over the uncorrected injector actuation current 56 for a predetermined period of A'.

The resultant duration of the corrected main and anchor delays 50' and 52' is reduced.

The extended duration of each pulse of the corrected injector actuation current 56' correlates to the solenoid energizing the poppet valve to remain in a closed state longer, thereby extending the period that the injector 12 pressure remains above the check valve threshold pressure. This is illustrated by the fact that the duration of each pulse of the wave trace for the corrected injector pressure curve 58' is greater than for the uncorrected injector pressure curve 58.

A corrected fuel injection flow rate curve 60' (FIG. 3) reflects the effects of the extended duration of the corrected injector actuation current, yielding pulses of greater duration than for the uncorrected fuel injection flow rate curve 60 (FIG. 2). Accordingly, the corrected injected fuel volume curve 62' (FIG. 3) shows an increase in the volume of fuel injected.

Fuel delivery for mechanically actuated electronically controlled fuel injectors is indirectly specified in terms of "millimeters of rack", which refers to pre-electronic injection systems that used a rack and pinion flow control mechanism. In an effort to provide continuity of understanding during the transition to such electronically controlled injectors, the "rack" nomenclature has been retained, though it has to be converted to "microseconds of actuation current duration" for the injection event. A given rack is calculated by multiplying the duration of a given injection event by the engine speed, and dividing the product by a corresponding gain factor. That is to say, rack=(duration)(engine speed)/(gain factor).

The pilot rack is, therefore, equal to the duration of the pilot shot 44 multiplied by the engine speed and divided by the corresponding gain factor.

The gain factor is determined by the slope of the corresponding wave trace pulse of the injector pressure curve 58, which is a function of the portion of the cam profile generating that particular shot event. Likewise, the respective rack for main and anchor shots 46 and 48 is determined by multiplying the respective duration of the main and anchor shots 46 and 48 by the engine speed and dividing by the respective gain factor of the main and anchor shots 46 and 48.

Similarly, the pilot offset or trim or deviation rack can be computed by multiplying the pilot offset, injection delay, or trim duration by the engine speed, and dividing the product by the pilot gain factor. The main and anchor trim rack can be calculated in like fashion using respective offset duration and gain factor values.

Manipulating the above equation, it is understood that a given duration can be found by dividing the product of a corresponding rack and gain factor by the engine speed, i.e., duration=(rack)(gain factor)/(engine speed).

Using this equation, it is possible to calculate the duration that the ECM 42 should activate the solenoid to maintain the injector actuation current to assure that the injector 12 injects the desired volume of fuel to the cylinder associated therewith within a given shot duration as follows:

corrected pilot injector current duration=(pilot rack+pilot offset rack)(pilot gain factor)/engine speed;

corrected main injector current duration=(main rack+main offset rack)(main gain factor)/engine speed; and corrected anchor injector current duration=(anchor rack+anchor offset rack)(anchor gain factor)/engine speed.

Once the duration, offset duration and gain factor are determined for a given pilot, main or anchor shot 44, 46 and 48, the software of the present invention enables the ECM 42 to calculate the extended duration P', M' and A' of each injector actuation current pulse necessary to inject the desired amount of fuel to the cylinder during each corrected pilot, main and anchor shot 44', 46' and 48'. In the preferred embodiment, the offsets are empirically determined. For example, a table may include values for pilot offsets based upon engine speeds. Alternatively, the respective offsets may be dynamically determined.

FIGS. 4a and 4b illustrate a flow chart showing the logic steps performed by the ECM 42 of the present invention to determine the extended durations P', M' and A' of the injector actuation current.

FIG. 4a shows the first stage of a software flow chart 72 enabling the ECM 42 to calculate the desired durations for the corrected pilot, main, and anchor shots 44', 46', and 48'. As indicated in block 73, the ECM 42 determines the engine speed. The use of engine speed sensors are well known in the art. The ECM 42 then establishes the gain factor for the pilot, main, and anchor shots 44, 46, and 48, as shown in block 74. This can be done as previously explained by determining the shape of the appropriate wave trace pulse of the injector pressure curve 58, either dynamically or empirically, or by other known methods. As shown in block 75, the ECM 42 then refers to a look up map to determine a cam correction factor for the pilot, main, and anchor shots 44, 46 and 48. This map can be a two dimensional map with timing in engine degrees as the independent axis. The pilot cam correction factor is determined using pilot shot timing; the main cam correction factor is determined using main shot timing; and the anchor shot cam correction factor is determined using anchor shot timing. The ECM 42 then modifies the pilot, main, and anchor gain factors established in block 74 by their respective cam correction factor as shown in block 76. This correction takes into account physical cam profile differences that are associated with the localized cam characteristics in relation to piston top dead center for a particular cylinder and, in the preferred embodiment, would be substantially identical for all cylinders for a given engine angle. Next, as shown in block 77, the ECM 42 determines the respective pilot, main, and anchor rack by partitioning total rack to pilot, main and anchor shots with a method that is implementation dependent. In one embodiment, the number of fuel shots, or injections, the timing of the injections, and the injection quantity may be determined in response to the engine speed and engine load.

Stage two of the flow chart 72 is shown in FIG. 4b. As indicated in block 78, the ECM 42 establishes the pilot offset rack. For example, the pilot offset rack may be determined based upon the engine speed, using a look up table. Alternatively the pilot offset rack may be dynamically calculated using the rack equation set forth above. Proceeding to block 79, the ECM 42 determines whether the pilot rack is set equal to zero, which would indicate that no pilot shot 44 is desired for this particular injection event. If the pilot rack is set equal to zero, the ECM 42 sets the pilot offset rack to zero, as shown in block 80, thereby assuring that the pilot injection duration calculated at block 81 is equal to zero. Next, the ECM 42 calculates the corrected pilot injection duration as shown in block 81 wherein the pilot rack from block 77 and the pilot offset rack from block 78 are combined in the rack equation as set forth in block 81. Therefore, the pilot injection delay may be accounted for based upon the pilot offset rack, which yields an additional injector current signal duration.

Next, the ECM 42 determines the anchor offset rack as shown in block 82 similar to the determination of the pilot offset rack. Proceeding to block 83, the ECM 42 determines whether the anchor rack is set equal to zero. If so, the ECM 42 proceeds to block 84 and sets the anchor offset rack to zero, thereby assuring that the anchor injection duration calculated at block 85 is equal to zero. Next, the ECM 42 proceeds to calculate the corrected anchor injection duration as shown in block 85. Here again, the anchor offset rack yields the additional injector current signal duration necessary to compensate for the SOC/SOI delay 68.

Finally, in similar fashion, the ECM 42 determines the main offset rack, as shown in block 86. As shown in block 87, the ECM 42 then determines whether the main rack is set equal to zero. If so, the ECM 42 proceeds to block 88 and sets the main offset rack to zero to insure that the main injection duration calculated at block 89 will be equal to zero. Next, the ECM 42 proceeds to calculate the corrected main injection duration as shown in block 89. Here again, the main offset rack yields the additional injector current necessary to compensate for the SOC/SOI delay 66. The ECM 42 then regulates the injector 12 to maintain the calculated duration for the respective corrected pilot, main, and anchor shots 44', 46', and 48'.

In one embodiment, the timing of the fuel injection signal may be modified in response to the injection delays. For example, depending on the cam profile, the timing of a particular shot may be advanced to account for the delay in achieving the desired injection pressure in the fuel injector. In this manner the desired timing of the injection may be maintained.

In one embodiment, the associated fuel quantities of subsequent shots of an event may be modified in response to a corrected injection signal. For example, if a pilot shot injection duration is corrected to the extent that the pilot injection signal overlaps with the main shot injection signal, then one or more of the injection signals are desirably modified with respect to either injection timing, injection duration or both. In one embodiment, the delay or signal separation (either time period or angular separation) between the end of the one corrected shot and beginning of another shot may be established. If the signal separation is less than a threshold signal separation, then one of the two injection signals may be modified. For example, in one embodiment, if the signal separation between the end of the pilot injection and the beginning of the main injection is less than a desired threshold, then the pilot duration may be further modified, e.g., shortened, to achieve the desired signal separation, and the amount the pilot duration is reduced by may be added to either the main shot duration, or preferably to the anchor shot duration in order to achieve the desired total fuel injection quantity. Alternatively, the timing of the pilot injection may be advanced until the desired signal separation is achieved, or the main injection timing may be delayed to achieve the desired signal separation. The manner in which the desired signal separation is achieved is implementation dependent, and is based upon the desired injection strategy and emissions goals.

Industrial Applicability

Utilization of an injection method and system in accordance with the present invention provides for better emission control during certain engine operating conditions as explained above. Although the particular injection waveform for delivering multiple fuel injections may vary depending upon the particular engine operating conditions, the present system is capable of determining the timing associated with each individual injection fuel shot, the injection duration, any delays between injection fuel shots, and the corrected pilot, main and anchor injection durations to compensate for the inherent SOC/SOI delay regardless of the type of electronically controlled fuel injectors being utilized, regardless of the type of engine being utilized, and regardless of the type of fuel being utilized. In this regard, appropriate fuel maps relating cam profile, engine speed, engine load, pilot/main/anchor duration times, pilot/main/anchor fuel quantities, anchor timing delay, and other parameters can be stored or otherwise programmed into ECM 42 for use during all operating conditions of the engine. These operational maps, tables and/or mathematical equations stored in the ECM programmable memory determine and control the various parameters associated with the appropriate multiple injection events to achieve desired emissions control. In the case of a hydraulically actuated fuel injector, the cam correction factor will be eliminated or replaced with a comparable correction factor based upon the construction and operation of the particular injector, and the gain factor may be tied to other parameters.

As is evident from the forgoing description, certain aspects of the present invention are not limited by the particular details of the examples illustrated herein and it is therefore contemplated that other modifications and applications, or equivalence thereof, will occur to those skilled in the art. It is accordingly intended that the claims shall cover all such modifications and applications that do not depart from the spirit and scope of the present invention.

Other aspects, objects and advantages of the present invention can be obtained from a study of the drawings, the disclosure and the appended claims.

What is claimed is:

1. A method for controlling injection current duration of a fuel injector to inject a predetermined volume of fuel during each fuel shot of a multiple shot event, the method comprising the steps of:
    sensing engine speed;
    determining an initial injection current duration for each fuel shot;
    determining an injection pressure of fuel at about the time of a fuel shot;
    establishing an injection delay for each fuel shot; and
    determining a corrected injection current duration to inject the predetermined volume of fuel for each shot based upon the initial injection current duration, the injection pressure, the injection delay and the engine speed.

2. The method as set forth in claim 1 wherein the step of determining the injection pressure includes the step of determining a gain factor.

3. The method as set forth in claim 2 wherein the step of determining the gain factor includes the step of modifying the gain factor of each fuel shot in accordance with a cam correction factor.

4. The method as set forth in claim 1 wherein the step of determining the initial injection current duration for each fuel shot includes the step of determining the rack for each fuel shot.

5. The method as set forth in claim 4 wherein the step of determining the injection delay for each fuel shot includes the step of determining the offset rack for each shot.

6. The method as set forth in claim 5 wherein the step of determining the corrected injection current duration for each fuel shot includes the step of multiplying the respective gain factor by the sum of the respective rack and the respective offset rack and dividing by the engine speed.

7. The method as set forth in claim 1 wherein said injection delay is the delay between the start of the injection current and the start of fuel injection by the fuel injector.

8. The method as set forth in claim 1, further including the step of sustaining the corrected injection current duration for each shot of the fuel injection event.

9. A fuel injection control system for regulating injection duration of a fuel injector to inject a predetermined volume of fuel during each fuel shot of a multiple shot injection event, the fuel injector being operable to start fuel injection at a predetermined threshold injection pressure, the system comprising:
    an engine speed sensor operable to sense engine speed and generate an output signal indicative thereof; and
    an electronic controller in electrical communication with the engine speed sensor and the fuel injector;
    the electronic controller being operable to determine a fuel injection delay as a function of engine operating conditions for at least one fuel shot, and
    the electronic controller being operable to modify an injection signal to inject the predetermined volume of fuel during each fuel shot as a function of at least the determined injection delay and the signal from the engine speed sensor, the injection signal accounting for the time delay.

10. The fuel injection control system as set forth in claim 9 wherein the electronic controller determines an offset rack for each fuel shot, the offset rack corresponding to the respective determnined time delay.

11. The fuel injection control system as set forth in claim 10 wherein the electronic controller determines a rack for each fuel shot, the rack corresponding to a respective determined duration for the time when an injector pressure is greater than or equal to a predetermined injector threshold pressure.

12. The fuel injection control system as set forth in claim 11 wherein the electronic controller determines a respective gain factor for each fuel shot.

13. The fuel injection control system as set forth in claim 12 wherein the electronic controller determines a respective cam correction factor for each fuel shot.

14. The fuel injection control system as set forth in claim 13 wherein the electronic controller modifies the respective gain factor for each fuel shot in accordance with the cam correction factor.

15. The fuel injection control system as set forth in claim 14 wherein the electronic controller determines the injection duration necessary to completely inject the predetermined volume of fuel during each fuel shot by multiplying the respective gain factor by the sum of the respective rack and respective offset rack and dividing by the engine speed.

16. The fuel injection control system as set forth in claim 9, where the electronic controller is further configured to generate a signal to the fuel injector to sustain fuel injection during each fuel shot for the determined injection duration.

17. The fuel injection control system as set forth in claim 9, where the fuel injection delay corresponds to the time delay from an initial increase in injection pressure to the time the injector pressure reaches the predetermined threshold injection pressure for a fuel shot.

18. The fuel injection control system of claim 9, wherein said electronic controller determines a fuel injection delay as a function of injection fuel pressure.

19. The fuel injection control system of claim 9, wherein said electronic controller determines a fuel injection delay as a function of desired rack.

20. The fuel injection control system of claim 18, wherein the electronic controller determines a fuel injection pressure as a function of a gain factor.

21. The fuel injection control system of claim 20, wherein the electronic controller determines the gain factor as a function of a shape of a lobe on a camshaft associated with the engine.

* * * * *